(12) United States Patent
Shah

(10) Patent No.: US 6,557,771 B2
(45) Date of Patent: May 6, 2003

(54) INTEGRATED TEMPERATURE AND HUMIDITY CONTROLLER WITH PRIORITY FOR HUMIDITY TEMPERATURE CONTROL

(75) Inventor: Dipak J. Shah, Eden Prairie, MN (US)

(73) Assignee: Honeywell International Inc., Morristown, NJ (US)

(*) Notice: Subject to any disclaimer, the term of this patent is extended or adjusted under 35 U.S.C. 154(b) by 249 days.

(21) Appl. No.: 09/745,583

(22) Filed: Dec. 21, 2000

(65) Prior Publication Data

US 2002/0113132 A1 Aug. 22, 2002

(51) Int. Cl.[7] ............................................... F25B 49/02
(52) U.S. Cl. ................................... 236/44 C; 62/176.6
(58) Field of Search ............................. 62/176.1, 176.3, 62/176.6; 236/44 R, 44 A, 44 C, 78 D; 165/222, 223, 224, 225

(56) References Cited

U.S. PATENT DOCUMENTS

| | | | |
|---|---|---|---|
| 4,105,063 A | 8/1978 | Bergt | 165/21 |
| 4,889,280 A | 12/1989 | Grald et al. | 236/44 C |
| 5,346,128 A | 9/1994 | Wacker | 236/44 A |
| 5,346,129 A | 9/1994 | Shah et al. | 236/44 C |
| 5,351,855 A | * 10/1994 | Nelson et al. | 236/44 C |
| 5,675,979 A | 10/1997 | Shah | 62/176.6 |
| 5,737,934 A | 4/1998 | Shah | 62/176.6 |
| 6,012,296 A | 1/2000 | Shah | 62/173 |
| 6,029,466 A | * 2/2000 | Wieszt | 62/176.6 X |
| 6,220,039 B1 | * 4/2001 | Kensok et al. | 236/44 R X |

* cited by examiner

Primary Examiner—Harry B. Tanner

(57) ABSTRACT

A controller for a climate control system has a humidity temperature sensor as well as a dry-bulb temperature sensor. A humidity temperature value is used in connection with a dry-bulb temperature value to generate an error signal that is a function of either the dry-bulb or the humidity temperature values. This permits control of both enclosure temperature and enclosure humidity without abnormal cycling of the climate control system. The humidity temperature can synthesized from the relative humidity and dry-bulb temperature within the enclosure.

19 Claims, 3 Drawing Sheets

INTEGRATED TEMPERATURE AND HUMIDITY CONTROLLER WITH PRIORITY FOR HUMIDITY TEMPERATURE CONTROL

FIELD OF THE INVENTION

The present invention relates to thermostats and other thermal comfort controllers. The present invention particularly relates to controlling the operation of air conditioners. The invention is typically implemented in a mechanical cooling device that uses a microcontroller in conjunction with temperature sensors.

BACKGROUND OF THE INVENTION

Thermostats in use now typically direct the operation of air conditioners using dry bulb temperature as the control variable. A typical controller in air conditioning mode causes the air conditioning to begin operation when the temperature rises above the set point value. The air conditioner responds by injecting cold air into the enclosure until the temperature within the enclosure has fallen to a point below the set point value. A typical thermostat uses an anticipation element so as to turn on the air conditioning before the actual set point is exceeded. For many situations this type of control results in air temperature which is comfortable for the enclosure's occupants. It is well known that an air conditioner removes humidity from the air as well as cools it. The mechanism by which humidity is removed involves passing air from the enclosure or from the outside through the air conditioner, reducing the temperature of this air to substantially less than the comfort range (e.g. less than 74 degrees Fahrenheit).

In order to remove humidity from the air, the temperature of at least some of the cooled air must be lowered to less than the current dew point temperature, the temperature at which water condenses from the air. In this process, some of the water in the air condenses on the cooling coils of the air conditioner and drips off the coils to a pan below. Because air will not release any of its humidity until it reaches 100% relative humidity, i. e. its dew point temperature, it is necessary for at least the air adjacent to the cooled surfaces of the heat exchanger to reach this temperature. The total air stream through the air conditioner, however, may not reach 100% relative humidity because not all the air is cooled to its dew point. Consequently, relatively cold and dry air conditioned air is mixed with the uncomfortably warm and humid air to achieve a more acceptable 40–60% relative humidity at a comfortable temperature of 70–75 degrees Fahrenheit.

Normally such a procedure results in air within the enclosure whose humidity is within the desired comfort range. However, there are situations where humidity levels are still too high, resulting in an uncomfortable enclosure even when the temperature requirement has been met. To achieve air at the comfortable levels of both temperature and humidity, an air conditioner is sized for the expected load which the enclosure will present so that when the set point temperature is reached, humidity is acceptable. In cases of unusually high humidity or the air conditioner capacity relative to the current environmental conditions does not result in dehumidification when the set point temperature is reached, it is possible for the air in the enclosure to have excessive humidity.

Previous attempts to control the relative humidity in enclosures have been made by simply adding a relative humidity sensor to the thermostat and then controlling the air conditioner to hold the relative humidity within the selected set point range. The problem with these approaches is that the relative humidity of the enclosure air may actually rise as the air is cooled and dehumidified within the enclosure. This is because the relative humidity is a function of both the amount of water vapor in a given volume or mass of air and its dry bulb temperature. Relative humidity for any volume of air is defined as the ratio of the partial pressure of the water vapor in the air to the vapor pressure of saturated steam at that temperature. Since the vapor pressure of saturated steam drops rapidly within a temperature, a relatively small amount of water vapor and volume of air at a lower temperature can result in 100% relative humidity. Thus it is possible to have a run-a-way situation where the humidity control function in a thermostat continues to call for further dehumidification, and as the temperature within the enclosure falls, relative humidity rises and locks the air conditioning on.

Subsequent attempts to solve the problem of high humidity have involved controlling the dew point temperature of enclosure air independently of the dry bulb temperature. See U.S. Pat. No. 4,105,063 to Bergt and U.S. Pat. No. 4,889,280 to Grald and MacArthur. However, these devices suffer from disadvantages of the achieved enclosure temperature not always being comfortable, and having a potential for over-cycling of the cooling system. Additionally, none of the references listed above provide dehumidification after the dry-bulb temperature set point has been achieved.

Other climate control systems have included using a humidity sensor, and a dry bulb temperature sensor in the enclosure. See U.S. Pat. Nos. 5,737,934 and 5,675,979. Control of humidity using a reheat system which re-heats chilled air in order to keep the dry bulb temperature of an enclosure to a specific set point is disclosed in U.S. Pat. No. 6,012,296. Another invention on the subject of temperature and humidity control has emphasized using the numerically larger of the dry bulb and humidity temperature errors. An indoor climate controller system adjusting both dry-bulb temperature and wet-bulb or dew point temperature in an enclosure is disclosed in U.S. Pat. No. 5,346,129 and is incorporated herein by reference.

In view of the above, it is apparent that there is a need to provide a more reliable and efficient system for controlling a climate modifying apparatus such as an air conditioner, heat pump, fan coil unit, and the like, when there is unusually high humidity. There is also a need to provide a climate control device that does not over cycle or leave the air conditioning stuck in the ON position.

SUMMARY OF THE INVENTION

In view of the foregoing, it is an object of the present invention to provide control of an indoor climate modifying apparatus such as an air conditioning unit to maintain thermal comfort for the occupants of enclosures. Another object is to control the operation of a mechanical cooling device such as an air conditioner, heat pump operating in the cooling mode, fan coil unit operating in the cooling mode, or the like.

A further object of the invention is to have the dry bulb temperature and the humidity temperature error continuously monitored.

Still another object of the invention is to provide a memory that records the dry bulb temperature set point value and a humidity temperature set point value, providing a set point signal encoding the dry bulb and humidity temperatures set point values.

A further object of the invention is to provide a humidity temperature value that is used in connection with the dry-bulb temperature to generate an error signal that is a function of either the dry-bulb or the humidity temperature values. This permits control of both enclosure temperature and enclosure humidity without abnormal cycling of the climate control system.

A further object of the invention is to provide error values for input into a temperature control algorithm used by a controller of the climate control system to determine the times to activate the climate control system for modifying the temperature and humidity of air within the enclosure.

In one embodiment of the present invention, a controller continuously monitors the dry bulb temperature error and the humidity temperature error within the enclosure and controls the ON/OFF status of the cooling device based on the following criteria: a) if the humidity temperature error is less than or equal to zero, the dry bulb temperature error is used in a conventional PID (proportional, integral, derivative) control block to control the ON/OFF status of the cooling device, modifying the enclosure temperature and humidity; or b) if the humidity temperature error is greater than zero, the dry bulb temperature error is ignored regardless of its magnitude and the humidity temperature error is used in a conventional PID control block to control the ON/OFF status of the cooling device; or c) if both the humidity temperature error and the dry-bulb temperature error are less than zero, the numerically larger of the humidity temperature error and the dry-bulb temperature error is used in a conventional PID control block to control the ON/OFF status of the cooling device. Both the humidity temperature error and the dry bulb temperature error use the same PID control block and controller gains to prevent any sporadic equipment operation.

These and other objects not specifically enumerated herein are believed to be addressed by the present invention which contemplates a controller for a climate control system that can give priority to humidity temperature control.

DETAILED DESCRIPTION OF THE INVENTION

Figure 1:
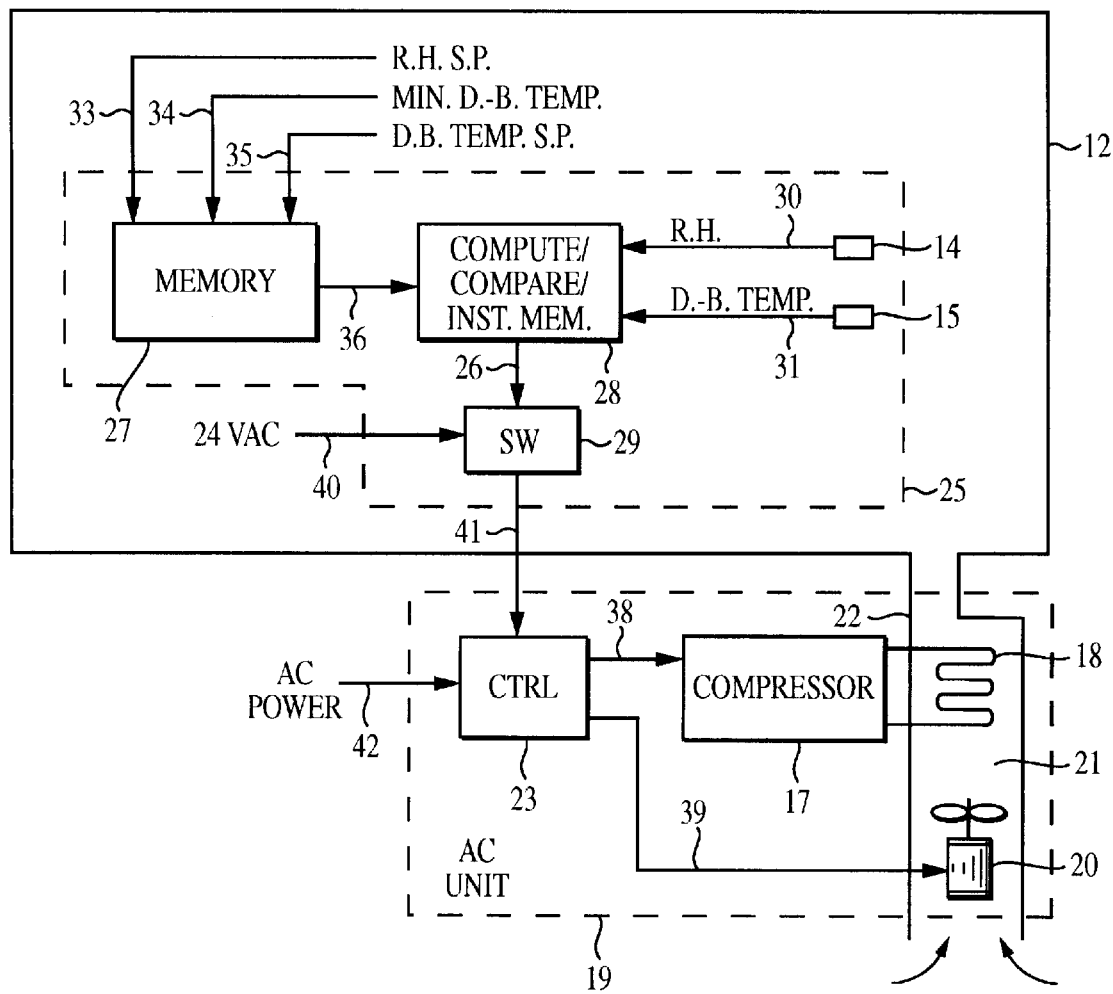
FIG. 1 is a block diagram of a complete air conditioning installation employing the invention.

The description contained herein relates to the specific structures of a controller for a climate control system, as presently contemplated. This description, however, is intended to be illustrative only and not limiting as to the scope of the present invention. For example, while the invention will be described in the context of a controller for an air conditioner, the invention is applicable to a variety of climate control systems as well.

In the drawings, where like numerals indicate like elements, there is shown a controller for a climate control system in accordance with the present invention. The drawings are schematic in that non-essential elements have been omitted.

As shown in FIG. 1, the invention is implemented in a controller 25 for an air conditioning installation. However, application of this invention could also be used in controlling the operation of other mechanical cooling devices such as a heat pump operating in the cooling mode, a fan coil unit operating in the cooling mode, and the like.

An enclosure 12 receives cooled and dehumidified air from air conditioning unit 19 which operates on externally supplied AC power provided on conductors 42. A control element 23 switches power to a compressor 17 and a blower 20 on conductors 38 and 39 respectively, thereby providing sequencing as needed for their operation. Compressor 17 provides liquid coolant to expander coil 18 which is located in a heat exchanger plenum 21 along with the blower 20. The air conditioning unit 19 operates while a demand signal is present on path 26. A demand signal on path 26 closes switch 29, allowing control current supplied by a 24 VAC source on path 40 to flow to the air conditioning unit control element 23 on path 41. While air conditioning unit 19 is operating, fan 20 forces air across coil 18 to cool and dehumidify the air. This conditioned air flows into enclosure 12 through duct 22 to reduce both the temperature and humidity of the air within enclosure 12. The demand signal on path 26 is provided by a controller 25 whose functions occur within electronic circuitry.

Controller 25 includes a memory unit 27 that stores digital data and a processor unit 28 that performs computation and comparison operations on data supplied to it from both memory 27 and from external sources and includes an instruction memory element. Preferably, a microcontroller functions as memory 27 and processor 28. Controller 25 has a humidity sensor 14 located within enclosure 12 and which provides a humidity signal on path 30 which is shown as encoding the relative humidity of the air within enclosure 12, but additionally may encode the dew point temperature or the wet-bulb temperature of this air. A temperature sensor 15 also located within enclosure 12 similarly encodes a dry-bulb temperature value in an air temperature signal on path 31. Processor 28 receives these signals and converts them to digital values for internal operations. The encoding in the present invention may be of digital signals or analog signals.

Paths 33–35 carry signals to memory 27 encoding various pre-selected set point values necessary for implementation of this invention. An occupant of enclosure 12 may select set point values by simply manipulating controls on the exterior of controller 25. Path 33 carries a humidity signal encoding a humidity set point value representative of the desired relative humidity within the enclosure 12. This humidity set point value may be actual desired relative humidity, or the desired dew point temperature, or even the desired wet-bulb temperature. Path 34 carries to memory 27 a signal encoding a minimum dry-bulb temperature set point value which serves as a limit value for dry bulb temperature. Path 35 carries a signal encoding an air (dry-bulb) temperature set point value. Memory 27 records these three set point values, and encodes them in a set point signal carried to processor 28 on a path 36. If memory 27 and processor 28 are formed of a microcontroller, the procedures by which these set point values are provided to processor 28 when needed are included in further circuitry not shown which provides a control function for overall operation of such a microcontroller.

Figure 2:
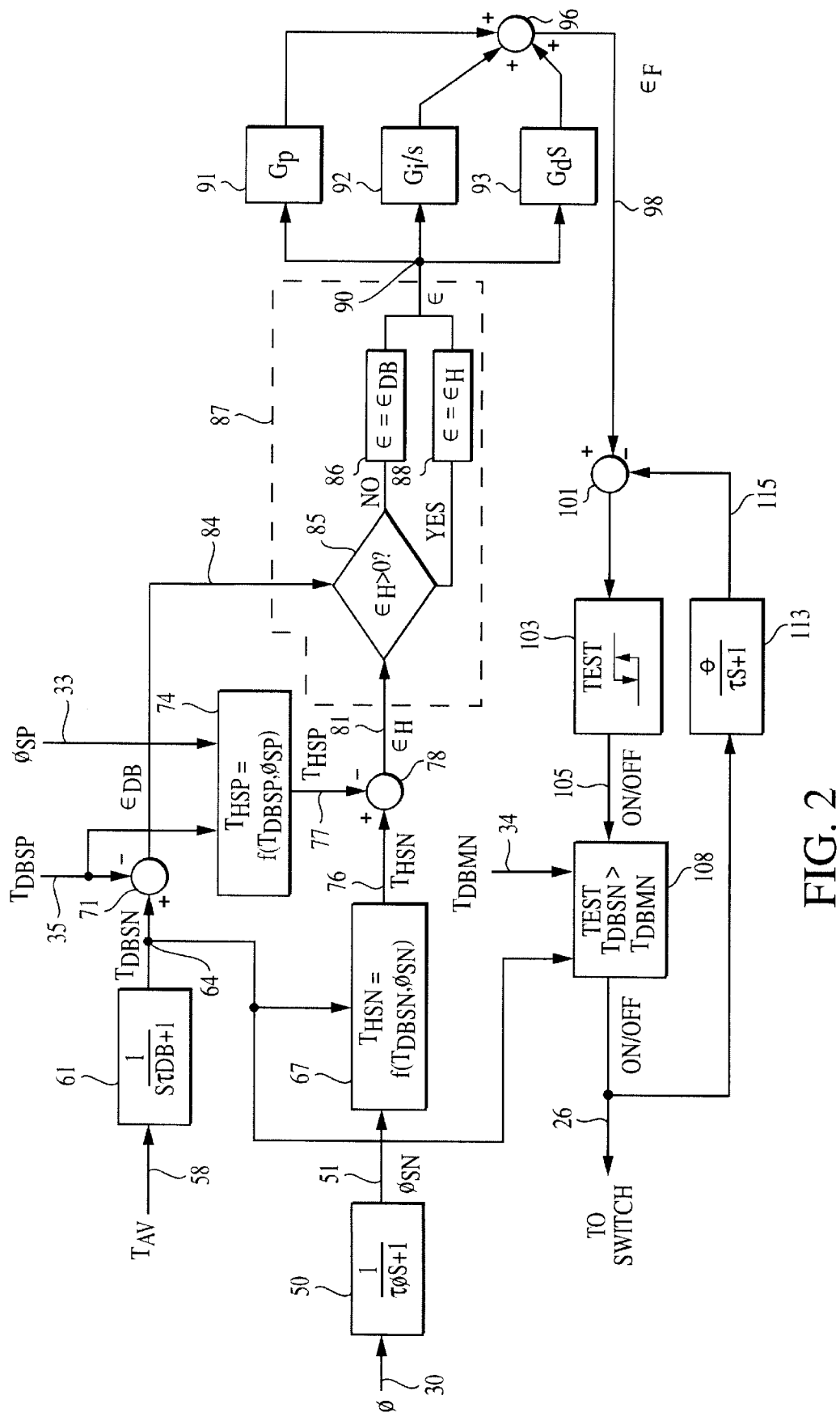
FIG. 2 is a computation diagram specifying a preferred embodiment of the algorithm implemented by a controller for a climate control system.

Processor unit 28 has internal to it, a memory in which are stored instructions which are executed by processor unit 28. The execution of these instructions results in processor unit 28 performing the functions shown in detail by the functional block diagram of FIG. 2. FIG. 2 represents modifications to the hardware broadly shown in FIG. 1, in which the modifications allow processor unit 28 to implement the invention. As shown, each element of FIG. 2 has an actual physical embodiment within processor unit 28. The execution of each instruction causes the processor unit 28 to physically become part of an element shown in FIG. 2 while the instruction is executed. The memory within the processor unit 28 also forms a part of each of the functional blocks in FIG. 2 by virtue of it storing and supplying the instructions which cause the creation of the functional blocks.

Also, arithmetic operation registers within processor unit 28 temporarily store the results of the computations. These can be considered to form a part of memory 27 even though perhaps physically located within the processor unit portion of the microcontroller.

As shown in FIG. 2, signal transmissions are represented by lines originating from one functional block and terminating at another as illustrated by the arrows. This implies that signals created by one function element are supplied to another for use. This occurs within a microcontroller when a series of instructions whose execution causes the microcontroller to comprise one functional element, actually produces digital values which are then transmitted within the microcontroller on its signal paths for use by the circuitry when executing instructions for another functional element. The same physical signal paths within a microcontroller may carry different signals, each of whose paths are shown individually in FIG. 2.

Figure 3:
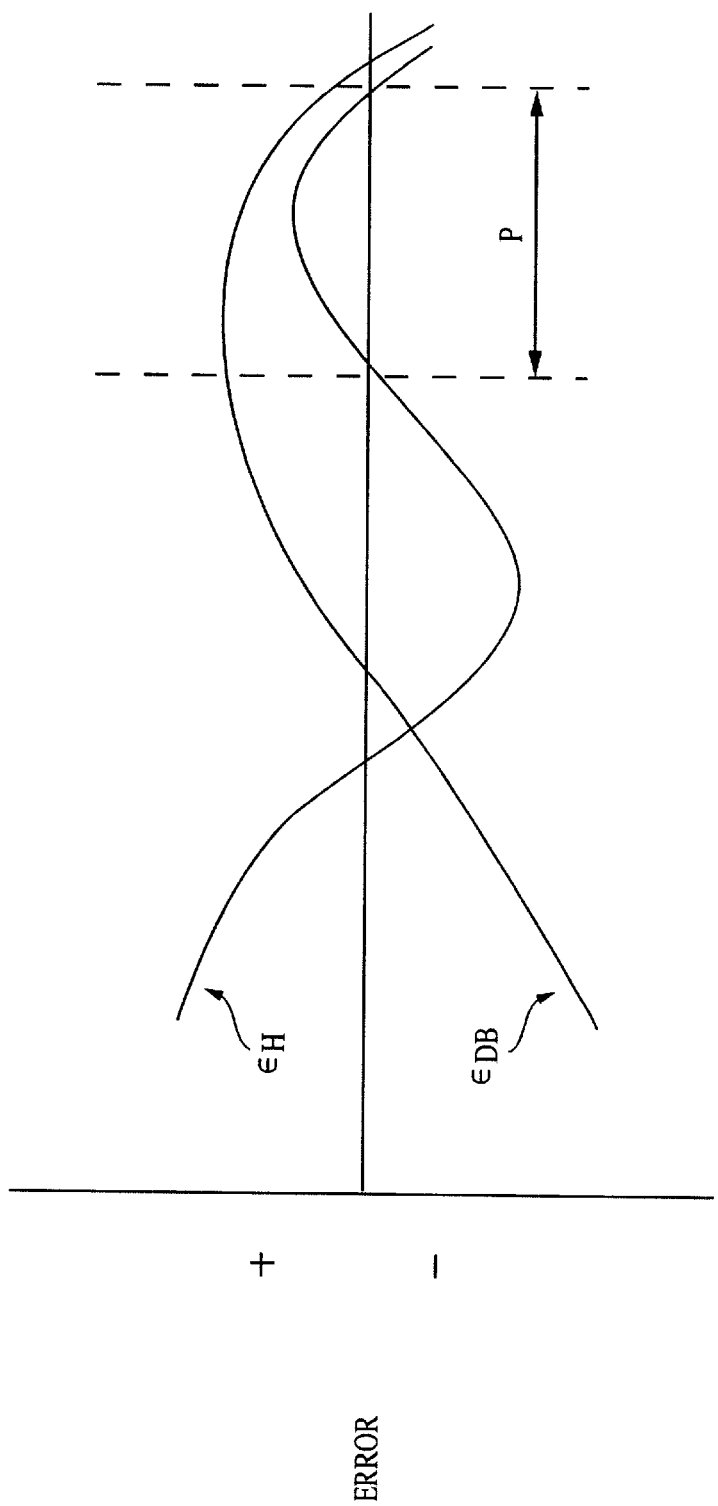
FIG. 3 is a graphical diagram of the conditions under which the preferred embodiment is implemented by a controller.

The legend below defines each value encoded in the signals as shown in FIGS. 2 and 3:

| Reference Value | Description |
| --- | --- |
| $T_{AV}$ | Weighted average room temperature of enclosure 12 |
| $\Phi$ | Enclosure 12 relative humidity |
| $T_{DBSN}$ | Sensor-derived dry-bulb temperature of the air in enclosure 12 with lag corrections |
| $T_{DBSP}$ | Dry-bulb temperature set point for enclosure 12 |
| $\Phi_{SP}$ | Relative humidity set point for enclosure 12 |
| $\Phi_{SN}$ | Sensor-derived relative humidity of the air in enclosure 12 with lag corrections |
| $\epsilon_{DB}$ | Dry-bulb temperature error |
| $T_{HSN}$ | Sensed humidity temperature for enclosure 12 |
| $T_{HSP}$ | Calculated humidity temperature set point for enclosure 12 |
| $\epsilon_H$ | Humidity temperature error |
| $T_{DBMN}$ | Minimum allowable value for $T_{DBSN}$ |
| $\epsilon_f$ | Final error value provided by P-I-D function |

Referring to FIG. 2, the individual functional blocks have internal labels which describe the individual functions represented. Each rectangular block represents some type of mathematical or computational operation on the value encoded in the signal supplied to the block. For example, the signal on path 58, which encodes the average room temperature $T_{AV}$, is shown supplied to functional block 61, to collectively represent an apparatus which forms a Laplace transform operation of $T_{AV}$. Other functional blocks represent decision operations, calculation of other mathematical functions, such as multiplication, and other Laplace transform operations of various types. Circles to which are supplied two or more signals imply a sum or difference calculation as indicated by the adjacent plus or minus sign. Thus, the plus and minus signs adjacent the junctions of paths 35 and 64 with summation element 71 implies subtraction of the value encoded in the signal on paths 35 from the value encoded on path 64.

Preferably, the various calculations, operations, and decisions represented by FIG. 2 are performed in the sequence indicated at regular intervals, either each minute or continuously. If calculations proceed continuously, it is necessary to determine the time which elapses from one completion to the next in order to determine the rates of change of various values where it is important to the operation. Since temperatures and humidities within an enclosure 12 usually change very slowly, a once per minute calculation typically provides sufficient accuracy of control.

Block 61 receives a signal on path 58 encoding a value which represents a weighted average of the air temperature $T_{AV}$ in enclosure 12. Block 61 represents a Laplace transform operation on $T_{AV}$ intended to compensate for sensor response lag, and produces a signal on path 64 encoding $T_{DBSN}$. The $T_{DBSP}$ value on path 35 is subtracted from the $T_{DBSN}$ value encoded in the signal on path 64 to produce the dry-bulb temperature error value $\epsilon_{DB}$, which is the conventional error used to control air conditioners and furnaces. $\epsilon_{DB}$ is encoded in the signal on path 84.

Humidity is another variable for computing the error used for controlling operation of the air conditioning unit 19 (see FIG. 1). The present invention uses a relative humidity value $\Phi$ encoded in a signal from sensor 14 (see FIG. 1) supplied on path 30. The $\Phi$ value is supplied to a Laplace transform operation block 50 which compensates for the lag and instability in sensor 14, and provides a transformed relative humidity value $\Phi_{SN}$ on path 51.

It is common to determine both wet-bulb and dew point temperatures (either of which are hereafter collectively referred to as a humidity temperature) from a given dry-bulb temperature and a given relative humidity value. This is simply the digital or computational equivalent of manually looking up a value in a standard psychrometric chart. Computation block 67 receives ($\Phi_{SN}$ and $T_{DBSN}$ and computes an approximation of the sensed humidity temperature $T_{HSN}$, and encodes this value in the signal on path 76.

Computation block 74 performs a similar computation to derive an approximation for the humidity temperature set point $T_{HSP}$ from the dry-bulb temperature set point $T_{DBSP}$ and the relative humidity set point $\Phi_{SP}$. The same instructions within the processor memory 28 may serve to make both computations at different times, these instructions forming a subroutine which is called at the appropriate time and supplied with the relevant relative humidity value and dry-bulb temperature value. Block 74 receives the $T_{DBSP}$ value on path 35 and the $\Phi_{SP}$ value on path 33 and encodes the corresponding set point humidity temperature $T_{HSP}$ value in a signal on path 77. Block 74 can be considered as including a memory element which briefly stores $T_{HSP}$ at the end of the calculation. Summing block 78 receives the $T_{HSP}$ and $T_{HSN}$ values on paths 77 and 76 respectively, and forms the humidity temperature error value $\epsilon_H = T_{HSN} - T_{HSP}$ which is encoded in a signal carried on path 81. The individual signals on paths 81 and 84 encoding $\epsilon_H$ and $\epsilon_{DB}$ are used to calculate the initial error signal in decision block 87.

The advance which this invention provides is the use of a decision block 87. Decision block 87 uses the dry-bulb temperature error $\epsilon_{DB}$ and humidity temperature error $\epsilon_H$ to derive a second level or composite error value $\epsilon$ which is included in the signal carried on path 90. There are a number of different algorithms by which the composite error value can be derived. Preferably the algorithm is simply a decision block to set the error $\epsilon$ as equal to dry-bulb temperature error $\epsilon_{DB}$ or the humidity temperature error $\epsilon_H$. The determined error value controls the ON/OFF status of the cooling device. The decision block computation is based on the following criteria:

(a) if the humidity temperature error $\epsilon_H$ is less than or equal to zero (see reference number 85), the dry-bulb temperature error is used to calculate the error with the composite error value $\epsilon$ is equal to $\epsilon_{DB}$ 86; or (b) if the humidity temperature error is greater than zero (see reference number 85), the dry-bulb temperature error $\epsilon_{DB}$ is ignored regardless of its magnitude and the humidity temperature error $\epsilon_{DB}$ is used as the error value $\epsilon$ 88; or (c) if both the humidity temperature error $\epsilon_H$ and the dry-bulb temperature error $\epsilon_{DB}$ are less than zero, the composite error $\epsilon$ equals the numerically larger of the humidity temperature error $\epsilon_H$ and the dry-bulb temperature error $\epsilon_{DB}$.

It is not preferred to use the composite error value $\epsilon$ directly for deriving a demand signal. Instead $\epsilon$ is provided to a conventional PID (proportional, integral, derivative) control function comprising $G_p$, $G_i/s$ and $G_d s$ block 91–93 whose output values are then summed by a summing block 96 (also a part of the PID control function) to produce a final error value $\epsilon_f$ encoded in a final error signal on path 98.

The final error value $\epsilon_f$ carried on path 98 is converted to the demand signal on path 26. $\epsilon_f$ is modified through a number of conventional computational stages to insert an anticipation function in deriving the final demand signal on path 26. Each stage of the demand signal computation produces a signal having a logical 1 voltage level, which can be thought of as corresponding to the ON condition of air conditioning unit 19. The signal voltage on path 26 has a level corresponding to a logical 0 when the demand signal is not present. When a logical 1 is present on path 26, then switch 29 (see FIG. 1) is closed and current flows to air conditioning unit 19. When path 26 carries a logical 0 value, switch 29 is open and unit 19 does not operate.

The anticipation function is implemented in a conventional manner by the summing block 101 and functional blocks 103 and 113. Block 113 applies a Laplace transform operation $\theta/(\tau S+1)$ to the signal carried on path 26, shifting its logical 0 and 1 values in time. Hysteresis test block 103 provides a first stage demand signal on path 105 whose logical 1 intervals disregard the relative magnitudes of $T_{DBSN}$ and $T_{DBMN}$. If the Laplace transform block 113 returns a value of 0 on path 115 to summing block 101, then the final error value $\epsilon_f$ on path 98 is used by the hysteresis test block 103 to determine the times and lengths of the first stage of the demand signal on path 105. If block 113 returns a value different from zero to summing block 101 then the error value $\epsilon_f$ on path 98 supplied to test block 103 is reduced by summation blocks 101, which will delay the starts of the demand signal and shorten its interval length, thereby delaying startup and speeding up shutdown times of air conditioning unit 19.

One further feature of this invention is a test block 108 which receives the first stage of the demand signal on path 105. In certain rare situations of extremely high humidity or poorly sized air conditioning units, or where relatively low value for $\Phi_{SP}$ is selected, it is possible that an uncomfortably low value of sensed dry-bulb temperature $T_{DBSN}$ may result when the humidity temperature error $\epsilon_H$ has been reduced to a level producing an $\epsilon$ value on path 90 allowing the air conditioning unit 19 to be on, i.e., run, for an extended period of time. To deal with this problem test block 108 receives the $T_{DBSN}$ value on path 64 and the $T_{DBMN}$ value on path 34. $T_{DBMN}$ is used as a limit dry-bulb temperature for halting operation of the air conditioning unit. If the condition $T_{DBMN}>T_{DBSN}$ arises, then regardless of the actual humidity in enclosure 12, the final demand signal on path 26 is dropped so as to cause air conditioning unit 19 to shut off before the humidity temperature error $\epsilon_H$ is reduced to the level producing a value of $\epsilon$ which normally would cause this.

Shown in FIG. 3 is a graphical layout of potential dry-bulb temperature errors and humidity temperature errors. In a thermostatic situation the goal is always to achieve zero error. The present invention deals efficiently with the situation where the humidity temperature error $\epsilon_H$ is positive, but less than the dry-bulb temperature error $\epsilon_{DB}$. In the zone marked on the graph as P, where there is a positive humidity temperature error $\epsilon_H$, the humidity temperature error $\epsilon_H$ will have a priority over the dry-bulb temperature error until the humidity temperature error $\epsilon_H$, is zero or non-positive. This means that the controlling error $\epsilon$ will be equal to the positive humidity temperature error $\epsilon_H$. Once humidity temperature error $\epsilon_H$ is non-positive, the dry-bulb temperature error $\epsilon_{DB}$ controls. Where the dry-bulb temperature error and the humidity temperature error are both below zero, the thermostat will be shut off.

Alternatively, a dehumidification system (not shown) may be attached to the present invention, or to the cooling system, where the thermostat is not taking enough moisture out of the air. Additional functionality may be added to change the speed of the fan 20 and/or to change the speed of the compressor 17 to remove humidity within the enclosure 12. For example, the speed of the fan 20 may be reduced to allow the air to have more contact time with the cooling coil 18, and/or increase the speed of the compressor 17 to increase the cooling capacity of the air conditioning unit 19.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proper by way of example to facilitate comprehension of the invention and should not be construed to limit the scope thereof.

What is claimed is:

1. An apparatus for cooperating with a controller for a climate control system, said controller activating the climate control system responsive to a composite error value encoded in a composite error signal falling within a preselected range of error values, said apparatus comprising:

a humidity sensor providing a humidity temperature signal encoding at least one of the wet-bulb temperature and the dew point temperature;

a temperature sensor providing an air temperature signal encoding the dry-bulb temperature value;

a memory recording a dry-bulb temperature set point value and a humidity temperature set point value, and providing a set point signal encoding the dry-bulb and humidity temperatures set point values;

a calculator receiving the humidity and air temperature signals and the set point signals, the calculator then computing the composite error value as a function of the values encoded in the humidity and air temperature signals and the set point signals, and for encoding the composite error value in the composite error signal; and wherein the composite error value is determined by:

i) when the humidity temperature is less than zero, the composite error equals the dry-bulb temperature error, and ii) when the humidity temperature error is greater than zero the composite error equals the humidity temperature error.

2. The apparatus of claim 1 further comprising an error processor for receiving the composite error signal and for providing a demand signal during intervals determined as a function of the composite error value.

3. The apparatus of claim 2, wherein the memory further comprises a storage for storing a limit dry-bulb temperature value and for providing a signal encoding the limit dry-bulb temperature value in a limit temperature signal, and wherein the error processor further comprises an evaluator for receiving the limit temperature signal and the sensed air dry-bulb temperature signal, for comparing the limit dry-bulb temperature with the value encoded in the sensed air dry-bulb temperature signal, and for suppressing the demand signal responsive to a predetermined relationship between the limit dry-bulb temperature value and the dry-bulb temperature value.

4. The apparatus of claim 1, wherein the humidity sensor comprises
   a) a relative humidity sensor providing a relative humidity signal encoding the value of the ambient relative humidity; and
   b) a calculator for receiving the air dry-bulb temperature signal and the relative humidity signal, for computing a humidity temperature approximation value, and for encoding the humidity temperature approximation value in the humidity temperature signal.

5. The apparatus of claim 4, wherein the memory further comprises a recorder to maintain a relative humidity set point value and the dry-bulb temperature set point value for computing the humidity temperature set point value as a function of the relative humidity set point value and the dry-bulb temperature set point value, and for providing a signal encoding the computed humidity temperature set point value.

6. The apparatus of claim 1, wherein the memory further comprises:
   i) a relative humidity set point value recorder;
   ii) a computed set point recorder for recording a computed humidity temperature set point value encoded in a computed humidity temperature set point value signal, and
   iii) an encoder for encoding the computed humidity temperature set point value as the humidity temperature set point value in the set point signal; and wherein the controller further comprises a unit for receiving the relative humidity set point value and the dry-bulb temperature set point value for computing the humidity temperature set point value as a function of the relative humidity set point value and the dry-bulb temperature set point value, and for providing the signal encoding the computed humidity temperature set point value to the computed set point recorder.

7. The apparatus of claim 6, wherein the calculator further comprises
   i) a unit for providing an initial error signal encoding the humidity temperature error and the dry-bulb temperature error; and
   ii) an evaluator for sensing the composite error and for encoding in the composite error signal.

8. A method of controlling the operation of a climate control system comprising:
   sensing the humidity temperature to provide a humidity temperature signal encoding at least one of the wet-bulb temperature and the dew point temperature;
   sensing the air temperature to provide an air temperature signal encoding a dry-bulb temperature value;
   recording a dry-bulb temperature set point value and a humidity temperature set point value;
   providing a set point signal encoding the dry-bulb and humidity temperatures set point values;
   receiving the humidity and air temperature signals and the set point signals, for computing a composite error value as a function of the values encoded in the humidity and air temperature signals and the set point signals, and for encoding the composite error value in the composite error signal;
   determining the composite error value by:
      i) when the humidity temperature is less than zero, the composite error equals the dry-bulb temperature error, and
      ii) when the humidity temperature error is greater than zero the composite error equals the humidity temperature error; and
   activating the climate control system responsive to the composite error value encoded in a composite error signal falling within a preselected range of error values to adjust the operation of the climate control system.

9. The method of claim 8 further comprising:
   providing a relative humidity signal encoding the value of the ambient relative humidity; and
   computing a humidity temperature approximation value.

10. The method of claim 9 further comprising:
    computing the humidity temperature set point value as a function of the relative humidity set point value and the dry-bulb temperature set point value.

11. A method of controlling the operation of a climate control system comprising:
    sensing the humidity temperature to provide a humidity temperature signal;
    sensing the air temperature to provide an air dry-bulb temperature signal;
    recording a dry-bulb temperature set point value and a humidity temperature set point value;
    providing a set point signal encoding the dry-bulb and humidity temperature set point values;
    determining a composite error value wherein:
       i) when the humidity temperature is less than zero, the composite error equals the dry-bulb temperature error, and
       ii) when the humidity temperature error is greater than zero the composite error equals the humidity temperature error; and
    modifying the operation of climate control system responsive to the composite error value.

12. A comfort controller for controlling the temperature and humidity within an enclosure, comprising:
    a humidity sensor;
    a temperature sensor; and
    a processor, wherein the processor determines a composite error value by:
       i) if the humidity temperature is less than zero, the composite error equals the dry-bulb temperature error, and
       ii) if the humidity temperature error is greater than zero the composite error equals the humidity temperature error; and
    wherein the controller adjusts a heating and air conditioning system responsive to the composite error value.

13. The comfort controller of claim 12 including a memory having:

a relative humidity set point value recorder;

a computed set point recorder for recording a computed humidity temperature set point value encoded in a computed humidity temperature set point value signal; and an encoder for encoding the computed humidity temperature set point value as the humidity temperature set point value in the set point signal; and wherein the controller further comprises a unit for receiving the relative humidity set point value and the dry-bulb temperature set point value for computing the humidity temperature set point value as a function of the relative humidity set point value and the dry-bulb temperature set point value, and for providing the signal encoding the computed humidity temperature set point value to the computed set point recorder.

14. An apparatus for cooperating with a controller for a climate control system, said controller activating the climate control system responsive to a composite error value encoded in a composite error signal falling within a preselected range of error values, said apparatus comprising:

a humidity sensor providing a humidity temperature signal encoding at least one of the wet-bulb temperature and the dew point temperature;

a temperature sensor providing an air temperature signal encoding the dry-bulb temperature value;

a memory recording a dry-bulb temperature set point value and a humidity temperature set point value, and providing a set point signal encoding the dry-bulb and humidity temperatures set point values;

a calculator receiving the humidity and air temperature signals and the set point signals, the calculator then computing the composite error value as a function of the values encoded in the humidity and air temperature signals and the set point signals, and for encoding the composite error value in the composite error signal; and wherein the composite error value is determined by:
i) when the humidity temperature is less than zero, the composite error equals the dry-bulb temperature error,
ii) when the humidity temperature error is greater than zero the composite error equals the humidity temperature error, and
iii) when both the humidity temperature error and the dry-bulb temperature error are less than zero, the composite error equals the numerically larger of the humidity temperature error and the dry-bulb temperature error.

15. The apparatus of claim 14 further comprising an error processor for receiving the composite error signal and for providing a demand signal during intervals determined as a function of the composite error value.

16. The apparatus of claim 15, wherein the memory further comprises a storage for storing a limit dry-bulb temperature value and for providing a signal encoding the limit dry-bulb temperature value in a limit temperature signal, and wherein the error processor further comprises an evaluator for receiving the limit temperature signal and the air temperature signal, for comparing the limit dry-bulb temperature with the value encoded in the air temperature signal, and for suppressing the demand signal responsive to a predetermined relationship between the limit dry-bulb temperature value and the dry-bulb temperature value.

17. The apparatus of claim 14, wherein the humidity sensor comprises
a) a relative humidity sensor providing a relative humidity signal encoding the value of the ambient relative humidity; and
b) a calculator for receiving the air temperature signal and the relative humidity signal, the calculator then computing a humidity temperature approximation value, and for encoding the humidity temperature approximation value in the humidity temperature signal.

18. The apparatus of claim 17, wherein the memory further comprises a recorder to maintain a relative humidity set point value and the dry-bulb temperature set point value for computing the humidity temperature set point value as a function of the relative humidity set point value and the dry-bulb temperature set point value, and for providing a signal encoding the computed humidity temperature set point value.

19. A thermostat comprising:

a humidity sensor providing a humidity temperature signal encoding at least one of the wet-bulb temperature and the dew point temperature;

a temperature sensor providing an air temperature signal encoding the dry-bulb temperature value;

a memory recording a dry-bulb temperature set point value and a humidity temperature set point value, and providing a set point signal encoding the dry-bulb and humidity temperatures set point values;

a calculator receiving the humidity and air temperature signals and the set point signal, the calculator then computing a composite error value as a function of the values encoded in the humidity and air temperature signals and the set point signal, and for encoding the composite error value in a composite error signal; and wherein the composite error value is determined by:
i) when the humidity temperature is less than zero, the composite error equals the dry-bulb temperature error,
ii) when the humidity temperature error is greater than zero the composite error equals the humidity temperature error, and
iii) when both the humidity temperature error and the dry-bulb temperature error are less than zero, the composite error equals the numerically larger of the humidity temperature error and the dry-bulb temperature error.

* * * * *